Oct. 20, 1925.  
J. T. JONES  
TRAP  
Filed Feb. 26, 1925    2 Sheets-Sheet 1
1,558,015
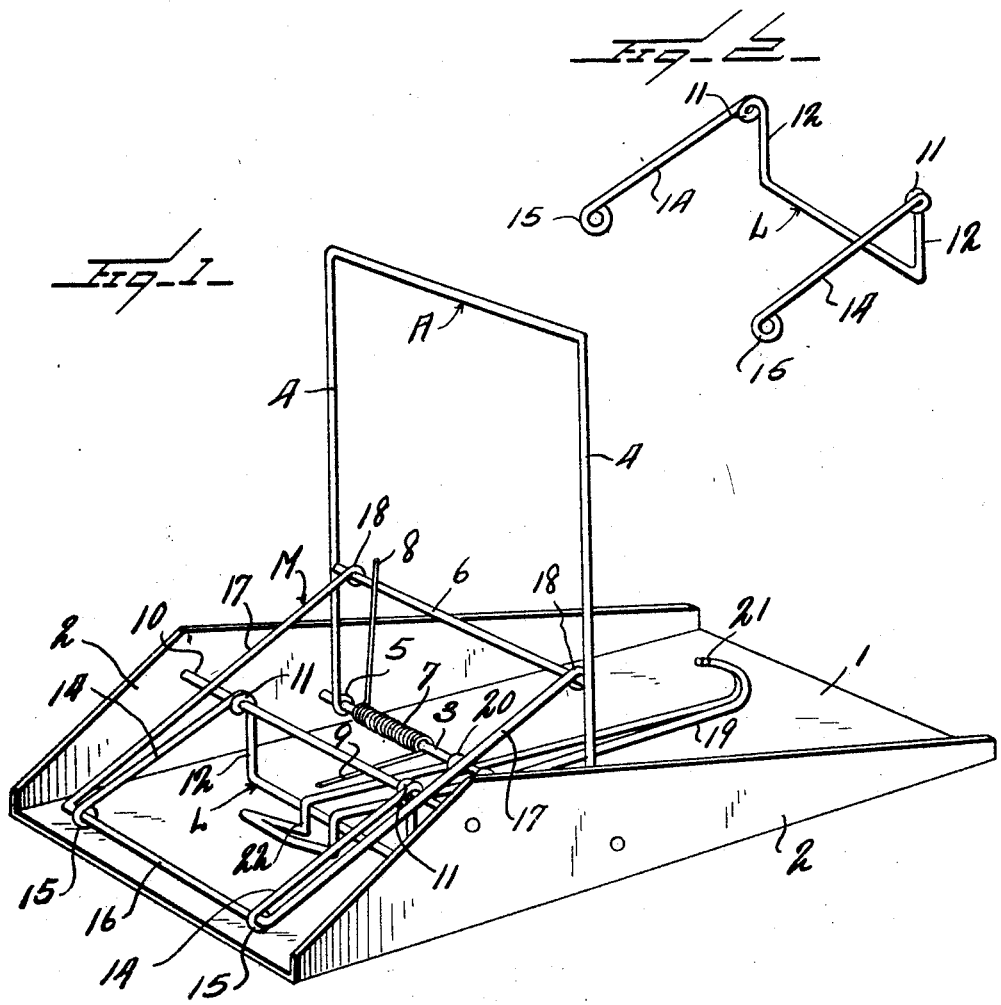
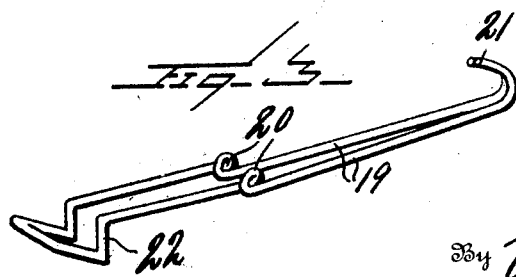
Inventor  
J. T. Jones  
By Watson E. Coleman  
Attorney

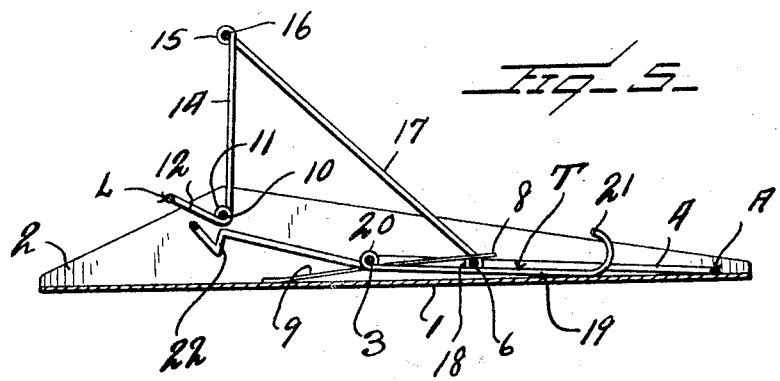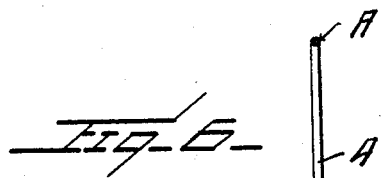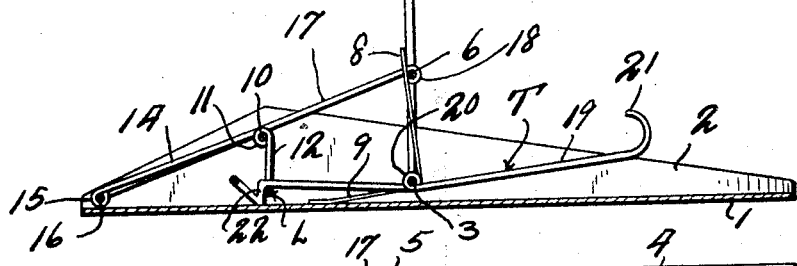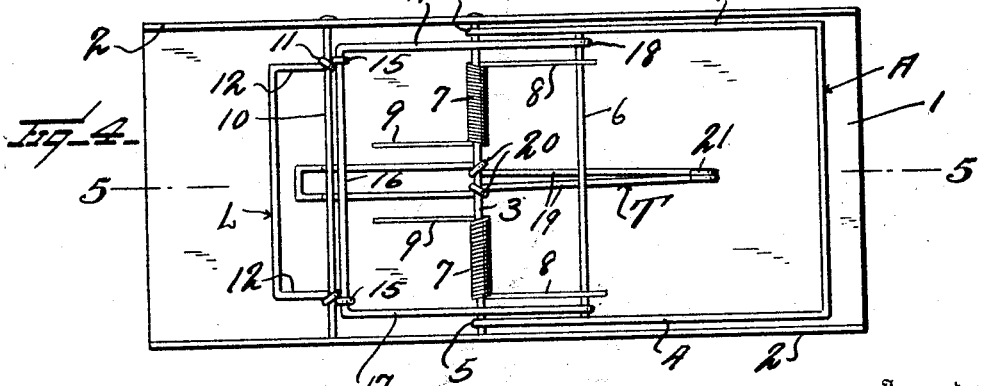

Patented Oct. 20, 1925.

1,558,015

UNITED STATES PATENT OFFICE.

JOHN T. JONES, OF STANFORD, KENTUCKY.

TRAP.

Application filed February 26, 1925. Serial No. 11,829.

*To all whom it may concern:*

Be it known that I, JOHN T. JONES, a citizen of the United States, residing at Stanford, in the county of Lincoln and State of Kentucky, have invented certain new and useful Improvements in Traps, of which the following is a specification, reference being had to the accompanying drawings.

This invention relates to certain improvements in traps and has relation more particularly to a device of this kind particularly designed and adapted for use in the catching of mice and kindred animals, and it is an object of the invention to provide a device of this kind provided with a spring operated jaw frame together with means for effectively maintaining said frame in set position.

Another object of the invention is to provide a device of this kind comprising a spring operated jaw frame together with a trigger mechanism for maintaining said frame in set position but readily releasing said frame when the victim imparts movement to the trigger.

The invention consists in the details of construction and in the combination and arrangement of the several parts of my improved trap whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in perspective illustrating a trap constructed in accordance with an embodiment of my invention with the jaw in set position;

Figure 2 is a view in perspective of the loop member herein disclosed unapplied;

Figure 3 is a view in perspective of the trigger member as herein embodied unapplied;

Figure 4 is a view in top plan of my improved trap with the jaw in release position;

Figure 5 is a sectional view taken substantially on the line 5—5 of Figure 4;

Figure 6 is a sectional view similar to Figure 5 with the jaw in set position.

As disclosed in the accompanying drawings, 1 denotes a base member or board of requisite dimensions and which is provided along its side margins with the upstanding walls 2 of preferred design. Supported by the walls 2 at a point in relatively close proximity to the base member or board 1 is a rod 3 which extends transversely across said member or board 1. A substantially U-shaped jaw A has the free extremities of its side members 4 provided with the eyes 5 which freely engage the rod 3 whereby the jaw A is mounted for swinging movement in a vertical direction. These side members 4 inwardly of but in relatively close proximity to the eyes 5 are connected by a cross rod 6.

The rod 3 has its opposite end portions surrounded by the coil springs 7 each having an extended arm 8 contacting with the cross member 6 and with a second etxended arm 9 in contact with the base member or board 1. When the jaw A is moved or raised to its set position, the springs 7 will be placed under such tension that when the jaw A is released it will be thrown downwardly toward the base member or board 1 with sufficient force or impact to capture a victim and to hold the victim against escape, the force of such impact being ordinarily sufficient to either kill or mortally wound the victim.

A second rod 10 is supported by the rear portion of the side walls 2 at a desired point above the rod 3 and freely engaged with said rod 10 are the eye members 11 arranged at the outer extremities of the side members 12 of the substantially U-shaped trigger loop L. Extending from the outer ends of the side members 12 and substantially at right angles thereto are the arms 14 terminating in the eye members 15 freely engaged with the intermediate or base portion 16 of the loop member M. This member M is also substantially U-shaped and the free extremities of its side members 17 are provided with the eye members 18 freely engaged with the opposite end portions of the cross rod 6.

When the jaw A is raised or swung upwardly into set position, the loop member M will be swung rearwardly and downwardly from above so as to properly position the trigger loop L.

The jaw A and the loops M and L are each preferably made of a strand of wire of requisite gauge.

The trigger T is also preferably formed of wire of requisite gauge and comprises the elongated parallel side members 19 formed at a predetermined point intermediate their ends with the eyes 20 while the forward end portions of said arms 19 are suitably united and curved upwardly to provide a bait hook 21. The rear end portions of the arms 19 are continued by the depending angular arms 22 to provide a hook member to engage the intermediate or base portion 23 of the trigger loop L when the jaw A is in set position. The rod 3 is disposed through the eyes 20 whereby said rod serves as a mounting for the trigger T.

When a mouse or other victim nibbles the bait applied to the trigger T the resultant movement or vibration of the trigger will disengage the hook 22 from the loop L whereby the jaw A will be forcibly swung by the springs 7 toward the base member or board 1 as hereinbefore described. The jaw A may be readily reset by imposing requisite pull upon the member M. When the trap is in released position, by pressing backward and downward on the base portion 16 of the loop member M, the trap will be reset automatically. Also by a slight pressure on this base portion 16 of the member M the victim can be released without the hands or fingers coming in contact with the animal.

From the foregoing description it is thought to be obvious that a trap constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A trap comprising a base member provided with spaced outstanding walls, a jaw positioned between and pivotally supported by the walls, means for forcibly throwing the jaw toward the base member, a rod extending between and supported by the outstanding walls, a substantially U-shaped frame having its side arms freely engaged with the jaw, a substantially U-shaped trigger loop having side members pivotally engaged with the rod, the pivoted portions of said side members being continued by angularly related arms, the extremities of said arms being pivotally connected with the intermediate portion of the frame, a trigger engageable with the loop member when in one position to hold the jaw in set position.

2. A trap comprising a base member provided with spaced outstanding walls, a jaw positioned between and pivotally supported by the walls, means for forcibly throwing the jaw toward the base member, a rod extending between and supported by the outstanding walls, a substantially U-shaped frame having its side arms freely engaged with the jaw, a substantially U-shaped trigger loop having side members pivotally engaged with the rod, the pivoted portions of said side members being continued by angularly related arms, the extremities of said arms being pivotally connected with the intermediate portion of the frame, and a trigger engageable with the loop member when in one position to hold the jaw in set position, the jaw being provided with a cross rod with which the side arms of the frame are directly engaged.

3. A trap comprising a base member provided with spaced outstanding walls, a jaw positioned between and pivotally supported by the walls, means for forcibly throwing the jaw toward the base member, a rod extending between and supported by the outstanding walls, a substantially U-shaped frame having its side arms freely engaged with the jaw, a substantially U-shaped trigger loop having side members pivotally engaged with the rod, the pivoted portions of said side members being continued by angularly related arms, the extremities of said arms being pivotally connected with the intermediate portion of the frame, and a trigger engageable with the loop member when in one position to hold the jaw in set position, the trigger loop being downwardly disposed when the jaw is in set position and the frame extending over and rearwardly of the rod.

4. A trap comprising a base member provided with spaced outstanding walls, a jaw positioned between the walls and pivotally supported for movement toward or from the base member, means for forcibly throwing the jaw toward the base member, a rod extending between and supported by the outstanding walls, a substantially U-shaped frame having its side arms freely engaged with the jaw, a substantially U-shaped trigger loop having side members pivotally engaged with the rod, the pivoted portions of said side members being continued by angularly related arms, the extremities of said arms being pivotally connected with the intermediate portion of the frame, and a trigger engageable with the loop member when in one position to hold the jaw in set position.

5. A trap comprising a base member provided with outstanding spaced walls, a rod extending between and supported by said walls, said rod being positioned closely adjacent to the base member, a substantially U-shaped jaw having its side members pivotally engaged with the rod, means for forcibly throwing the jaw in a direction toward the base member, a second rod extending between and supported by the walls at a point above and spaced from the first named rod, a trigger loop pivotally engaged with the second named rod and provided with angularly related arms, a substantially U-shaped frame having its side arms pivotally engaged with the jaw, the arms of the loop member being pivotally engaged with the intermediate portion of the frame, and a trigger mounted for rocking movement upon the first named rod and provided with means engageable with the loop member to hold the jaw in set position.

In testimony whereof I hereunto affix my signature.

JOHN T. JONES.